(12) United States Patent
Wang et al.

(10) Patent No.: US 12,282,514 B1
(45) Date of Patent: Apr. 22, 2025

(54) AI-ASSISTED DOCUMENT ORGANIZATION SYSTEM

(71) Applicants: Zhen-Sheng Wang, Santa Fe Springs, CA (US); Ze-Nong Wang, Santa Fe Springs, CA (US); Ze-Feng Wang, Santa Fe Springs, CA (US)

(72) Inventors: Zhen-Sheng Wang, Santa Fe Springs, CA (US); Ze-Nong Wang, Santa Fe Springs, CA (US); Ze-Feng Wang, Santa Fe Springs, CA (US)

(73) Assignee: Zhen-Sheng Wang, Santa Fe Springs, CA (US)

(*) Notice: Subject to any disclaimer, the term of this patent is extended or adjusted under 35 U.S.C. 154(b) by 47 days.

(21) Appl. No.: 18/522,270

(22) Filed: Nov. 29, 2023

(51) Int. Cl.
   *G06F 16/00* (2019.01)
   *G06F 16/93* (2019.01)

(52) U.S. Cl.
   CPC .................... *G06F 16/93* (2019.01)

(58) Field of Classification Search
   CPC ........................................... G06F 16/93
   See application file for complete search history.

(56) References Cited

U.S. PATENT DOCUMENTS

| | | | |
|---|---|---|---|
| 7,127,476 B2* | 10/2006 | Narahara | G06F 16/9535 707/999.203 |
| 7,792,789 B2* | 9/2010 | Prahlad | G06F 21/6227 715/733 |
| 11,443,102 B1* | 9/2022 | Wilson | G06Q 30/04 |
| 12,105,729 B1* | 10/2024 | Haq | G06F 16/338 |
| 12,210,949 B1* | 1/2025 | Silver | G06N 20/20 |
| 12,229,480 B1* | 2/2025 | Nawari | G06F 30/27 |
| 2001/0016852 A1* | 8/2001 | Peairs | H04N 1/21 705/28 |
| 2010/0077218 A1* | 3/2010 | Mitchel | G16H 10/20 709/204 |
| 2020/0396312 A1* | 12/2020 | Anderson, III | H04L 63/102 |
| 2021/0158234 A1* | 5/2021 | Sivasubramanian | H04M 3/5166 |
| 2022/0083606 A1* | 3/2022 | Drost | G06F 16/93 |
| 2022/0391994 A1* | 12/2022 | Cooksey | G06Q 40/03 |
| 2023/0020494 A1* | 1/2023 | Sommers | G06N 5/04 |

(Continued)

*Primary Examiner* — Noosha Arjomandi

(57) ABSTRACT

An AI-assisted document organization system includes an internet equipment, an identification equipment, a processing unit which is matched and connected to the internet equipment and the identification equipment. The processing unit includes a central processor, an artificial intelligence software and a document organization software. The document organization software includes document organization goals which include automatic document classification and identification, artificial intelligent data extraction, automatic data verification, automatic approval verification, compliance and regulatory compliance, document tracking and control, automatic reporting, and notification. The central processor drives the artificial intelligence software. The processing unit acquires document data through the identification equipment. The artificial intelligence software reads the document data and, based on the document organization goals set by the document organization software, to search relevant information via the internet equipment and intelligently calculate the best organization solution for the obtained document data. The database stores the classified and organized document data.

8 Claims, 1 Drawing Sheet

(56) References Cited

U.S. PATENT DOCUMENTS

| | | | |
|---|---|---|---|
| 2023/0049167 A1* | 2/2023 | Wilson | G06V 30/19107 |
| 2024/0281332 A1* | 8/2024 | Prahladka | G06F 11/076 |
| 2025/0053735 A1* | 2/2025 | Shevchenko | G06F 40/30 |

* cited by examiner

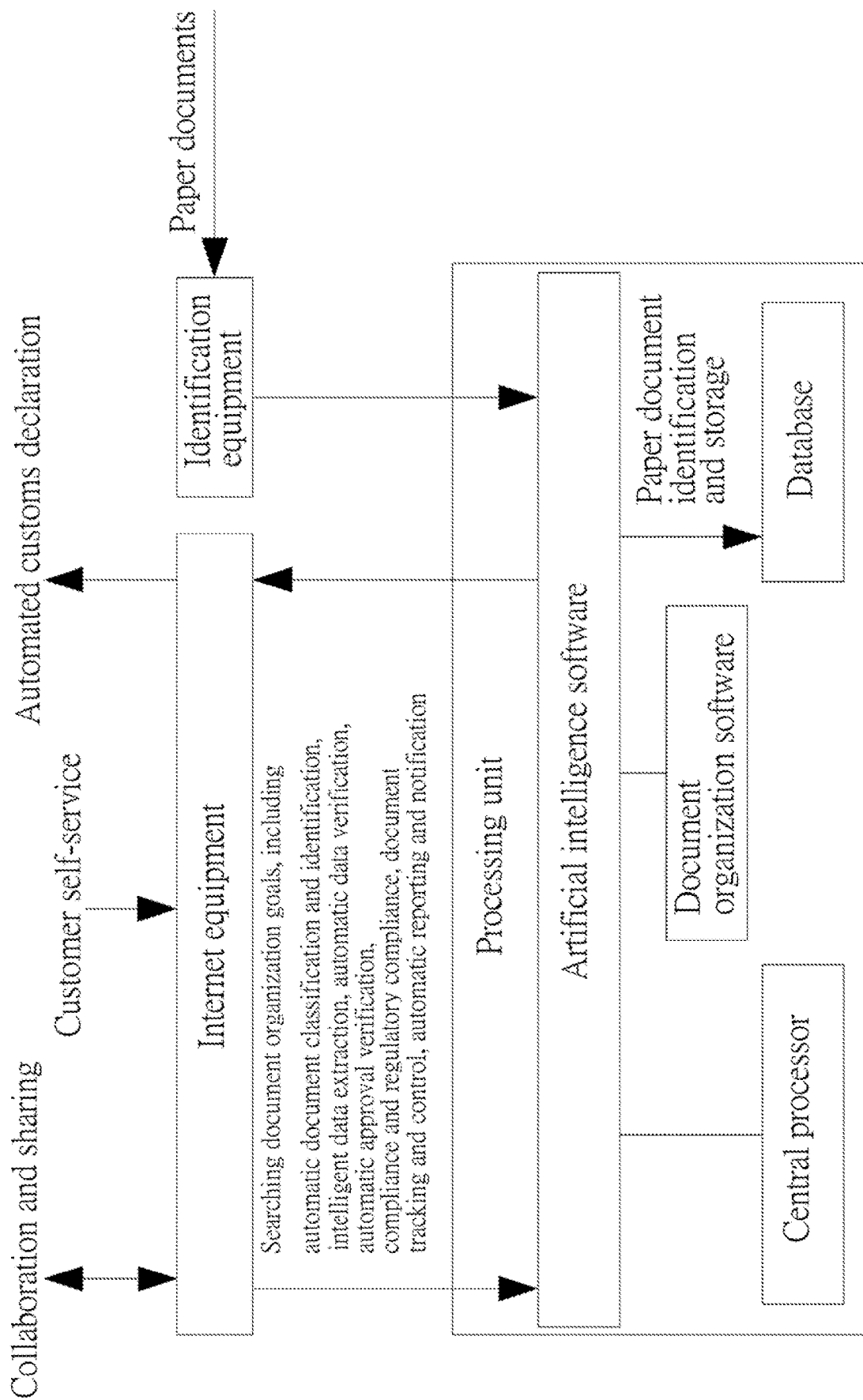

AI-ASSISTED DOCUMENT ORGANIZATION SYSTEM

BACKGROUND OF THE INVENTION

Fields of the Invention

The present invention relates to an AI-assisted document organization system, and more particularly, to a system that utilizes artificial intelligence to assist in the classification of individual documents.

Descriptions of Related Art

International import and export of goods are quite complex, involving the processing of import and export documents, payment of tariffs, customs clearance, insurance, and tracking of goods. Therefore, it is a common choice for businesses involved in the import and export of goods to collaborate with freight forwarders (shipping agents).

The freight forwarding industry needs to handle a significant volume of documents, such as documents issued by carriers or other agents. Therefore, document processing is a complex and critical task involving a large number of documents and information.

In traditional business operations, document organization and classification are still entirely manual, leading to high labor costs and low efficiency. The reasons for this issue include the large volume of international or loan business documents, reliance on manual data entry, document tracking in international freight, ensuring the complexity of documents' legality and compliance with various countries, complex approval processes, and the vulnerability of paper documents to damage.

Recognizing the above problems, if the current market continues to rely solely on manual document organization, maintaining competitiveness would require more investment in human resources. However, the increasing cost associated with additional manpower would gradually erode the company's profits, making it difficult to survive in the market. Therefore, there is a need to improve the traditional approach to document organization.

The present invention intends to provide an AI-assisted document organization system that eliminates the shortcomings mentioned above.

SUMMARY OF THE INVENTION

The present invention utilizes an identification equipment to recognize the content of paper documents and employs a processing unit containing an artificial intelligence software. Based on reasonable document organization goals, the system combines network data, intelligently computes the optimal organization solution for document data, classifies it, and stores it in a database. In this process, human intervention is only required when presenting the document to the identification equipment for content recognition. The rest of the procedure relies on artificial intelligence to handle the majority of tasks. Compared to the traditional manual approach to document organization, the system significantly reduces operational costs and effectively addresses the labor-intensive nature of traditional document organization. The present invention is innovative and progressive in comparison to conventional document organization methods that rely entirely on manual labor.

The present invention relates to an AI-assisted document organization system includes an internet equipment, an identification equipment, a processing unit which is matched and connected to the internet equipment and the identification equipment. The processing unit includes a central processor, an artificial intelligence software and a document organization software. The document organization software includes document organization goals which include automatic document classification and identification, artificial intelligent data extraction, automatic data verification, automatic approval verification, compliance and regulatory compliance, document tracking and control, automatic reporting, and notification. The central processor drives the artificial intelligence software. The processing unit acquires document data through the identification equipment. The artificial intelligence software reads the document data and, based on the document organization goals set by the document organization software, to search relevant information via the internet equipment and intelligently calculate the best organization solution for the obtained document data. The database stores the classified and organized document data.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 1 shows the operation of the AI-assisted document organization system of the present invention.

DETAILED DESCRIPTION OF THE PREFERRED EMBODIMENT

Referring to FIG. 1, the AI-assisted document organization system of the present invention comprises an internet equipment 1, an identification equipment 2 and a processing unit 3 that is matched and connected to the internet equipment 1 and the identification equipment 2. The processing unit 3 includes a central processor 31, an artificial intelligence software 32, a document organization software 33 and a database 34. The document organization software 33 includes document organization goals which include automatic document classification and identification, artificial intelligent data extraction, automatic data verification, automatic approval verification, compliance and regulatory compliance, document tracking and control, automatic reporting, and notification. The central processor 31 drives the artificial intelligence software 32. The processing unit 3 acquires document data through the identification equipment 2. The artificial intelligence software 32 reads the document data and, based on the document organization goals set by the document organization software 33, to search for information via the internet equipment 1, and to intelligently calculate the best organization solution for the obtained document data. The database 34 stores the classified and organized document data.

The processing unit 3 of the present invention can be a microcomputer, a server, or a similar device. The processing unit 3 can receive customer data and provide quotation responses through various means, such as via the internet or matching mobile app software.

The AI-assisted document organization system of the present invention further the following functions: data security and privacy, collaboration and sharing, customer self-service, customizability and version control, automated customs declaration, user-friendliness and training support, and integration with other systems.

Further details on the explanation of each document organization goal and functionality of the system are as follows:

Automatic Document Classification and Identification: The system is able to automatically identify and classify various types of cargo documents and certificates, including packing lists, invoices, customs clearance documents, contracts, etc. This aids in organizing and archiving documents.

Artificial intelligent Data Extraction: The system is capable of intelligently extracting key information from documents, such as goods descriptions, quantities, values, sender and receiver information, etc. This reduces the need for manual data entry and improves accuracy.

Automatic Data Verification: The system automatically verifies the accuracy and consistency of data in documents to reduce errors and ensure data quality.

Automated Approval Processes: The system is able to set up automated approval processes, approving or rejecting documents based on rules and conditions. This helps expedite the approval process and reduce delays.

Compliance and Regulatory Compliance: The system includes compliance checking features to ensure that documents comply with international, domestic, and regional regulations and compliance requirements.

Document Tracking and Monitoring: The system provides real-time document tracking and monitoring features, allowing users to check the status and location of documents at any time.

Automatic Reporting and Notifications: The system is capable of automatically generating reports and notifications, allowing users to stay informed about the progress and issues in document processing.

Data Security and Privacy: The system provides data encryption, access control, and backup features to ensure the security and privacy of documents and data.

Collaboration and Sharing: The system supports team collaboration and document sharing to enable different teams and partners to collaborate on document processing.

Customer Self-Service: The system offers customer self-service features, allowing customers to upload documents, tracking the progress of document processing, and viewing reports.

Customizability: The system has a certain level of customizability to meet the unique needs and processes of different freight forwarding companies.

Version Control: In document sharing and collaboration, the system provides version control features to ensure the correct document versions are used.

Automated Customs Declaration: For goods requiring customs declaration, the system is capable of automatically handling the customs declaration procedures, thereby improving the efficiency of the customs declaration process.

User-Friendliness and Training Support: The system's user interface is user-friendly, coupled with training and technical support to ensure that users can effectively utilize the system.

Integration with Other Systems: The system has the capability to integrate with other freight management systems, logistics tracking systems, etc., to achieve seamless connectivity in processes.

The present invention utilizes identification equipment to recognize the content of paper documents and employs a processing unit 3 containing artificial intelligence software 32. Based on reasonable document organization goals, the system combines network data, intelligently computes the optimal organization solution for document data, classifies it, and stores it in a database 34. In this process, human intervention is only required when presenting the document to the identification equipment 2 for content recognition. The rest of the procedure relies on artificial intelligence to handle the majority of tasks. Compared to the traditional manual approach to document organization, this method significantly reduces operational costs and effectively addresses the labor-intensive nature of traditional document organization. The present invention is innovative and progressive.

Combining the above content, it can be observed that the present invention brings the following benefits to the international freight forwarding industry in document organization, helping companies better cope with industry challenges, enhance competitiveness, and provide better services:

Improved Efficiency: The international freight forwarding industry involves a large number of documents, including cargo lists, packing lists, invoices, customs declaration documents, etc. Manual processing of these documents consumes a significant amount of time and is prone to errors. The AI-powered document processing system can enhance processing speed, reduce manual work, and thus improve efficiency.

The present invention utilizes the identification equipment 2 to recognize the content of paper documents and employs the processing unit 3 containing artificial intelligence software 32. Based on reasonable document organization goals, the system combines network data, intelligently computes the optimal organization solution for document data, classifies it, and stores it in the database 34. In this process, human intervention is only required when presenting the document to the identification equipment 2 for content recognition. The rest of the procedure relies on artificial intelligence to handle the majority of tasks. Compared to the traditional manual approach to document organization, the system significantly reduces operational costs and effectively addresses the labor-intensive nature of traditional document organization. The present invention is innovative and progressive in comparison to conventional document organization methods that rely entirely on manual labor.

Reduced Errors: Manual document processing is prone to data input errors, document loss, and inconsistencies. An artificial intelligence system can automatically verify the accuracy of data, reducing the risk of errors and improving data quality.

Automatic Classification and Identification: AI systems can automatically classify and identify different types of documents and certificates. This aids in organizing and archiving documents, enhancing retrieval efficiency.

Artificial intelligent Data Extraction: Artificial intelligence can intelligently extract key information from documents, such as cargo descriptions, quantities, values, etc. This reduces the need for manual data entry, saving time.

Automated Approval Processes: AI systems can establish automated approval processes, automatically approving or rejecting documents based on specific rules and conditions. This reduces delays in the approval process.

Tracking and Monitoring: AI systems can track the status and location of documents, providing real-time document monitoring and reporting. This helps in promptly identifying issues and taking corrective actions.

Compliance and Regulatory Compliance: The international freight forwarding industry needs to comply with various regulations and compliance requirements. AI systems can automate compliance checks, ensuring that documents conform to relevant regulations.

Customer Satisfaction: Providing more efficient document processing and accurate data contributes to higher customer satisfaction. Customers benefit from faster customs clearance and cargo tracking, reducing errors and uncertainty.

Cost Savings: Automated document processing can lower operational costs, reduce the need for human resources, enhance efficiency, and increase profits.

Handling Large-Scale Business: For companies dealing with large volumes of freight, an AI-driven document processing system can better manage the extensive document processing requirements.

While we have shown and described the embodiment in accordance with the present invention, it should be clear to those skilled in the art that further embodiments may be made without departing from the scope of the present invention.

What is claimed is:

1. An AI-assisted document organization system comprising:
   an internet equipment (1);
   an identification equipment (2);
   a processing unit (3) matched and connected to the internet equipment (1) and the identification equipment (2), the processing unit (3) including a central processor (31), an artificial intelligence software (32), a document organization software (33) and a database (34);
   the document organization software (33) configured with document organization goals which include automatic document classification and identification, artificial intelligent data extraction, automatic data verification, automatic approval verification, compliance and regulatory compliance, document tracking and control, automatic reporting, and notification;
   the central processor (31) driving the artificial intelligence software (32), the processing unit (3) acquiring document data through the identification equipment (2), the artificial intelligence software (32) reading the document data and, based on the document organization goals set by the document organization software (33), to search for information via the internet equipment (1), and to intelligently calculate the best organization solution for the obtained document data, and
   the database (34) storing the classified and organized document data.

2. The AI-assisted document organization system as claimed in claim 1, wherein the AI-assisted document organization system comprises data security and privacy functions.

3. The AI-assisted document organization system as claimed in claim 1, wherein the AI-assisted document organization system comprises collaboration and sharing functions, utilizing internet equipment (1) to collaborate with other systems in processing document organization.

4. The AI-assisted document organization system as claimed in claim 1, wherein the AI-assisted document organization system comprises customer self-service functions, allowing customers to provide document data directly to the system through internet.

5. The AI-assisted document organization system as claimed in claim 1, wherein the AI-assisted document organization system comprises customizability and version control functions.

6. The AI-assisted document organization system as claimed in claim 1, wherein the AI-assisted document organization system comprises automated customs declaration functions.

7. The AI-assisted document organization system as claimed in claim 1, wherein the AI-assisted document organization system comprises user-friendliness and training support functions.

8. The AI-assisted document organization system as claimed in claim 1, wherein the AI-assisted document organization system comprises integration with other systems functions.

* * * * *